(12) United States Patent
Bariant et al.

(10) Patent No.: US 10,324,182 B2
(45) Date of Patent: Jun. 18, 2019

(54) METHOD FOR IDENTIFYING AT LEAST ONE OBJECT IN A SURROUNDING AREA OF A MOTOR VEHICLE BY MEANS OF AN ULTRASONIC SENSOR, DRIVER ASSISTANCE SYSTEM AND MOTOR VEHICLE

(71) Applicant: VALEO Schalter und Sensoren GmbH, Bietigheim-Bissingen (DE)

(72) Inventors: Jean-Francois Bariant, Bietigheim-Bissingen (DE); Daniel Schuler, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 199 days.

(21) Appl. No.: 15/501,706

(22) PCT Filed: Aug. 4, 2015

(86) PCT No.: PCT/EP2015/067871
§ 371 (c)(1),
(2) Date: Feb. 3, 2017

(87) PCT Pub. No.: WO2016/020343
PCT Pub. Date: Feb. 11, 2016

(65) Prior Publication Data
US 2017/0227641 A1    Aug. 10, 2017

(30) Foreign Application Priority Data
Aug. 5, 2014 (DE) .................. 10 2014 111 124

(51) Int. Cl.
*G01S 15/93* (2006.01)
*G01S 15/42* (2006.01)
(Continued)

(52) U.S. Cl.
CPC .......... *G01S 15/931* (2013.01); *G01S 7/5273* (2013.01); *G01S 7/539* (2013.01); *G01S 15/42* (2013.01);
(Continued)

(58) Field of Classification Search
CPC ....... G01S 15/931; G01S 7/5273; G01S 15/42
See application file for complete search history.

(56) References Cited

U.S. PATENT DOCUMENTS

| | | |
|---|---|---|
| 2010/0034422 A1 | 2/2010 | James et al. |
| 2015/0219760 A1 | 8/2015 | Hiramaki et al. |

(Continued)

FOREIGN PATENT DOCUMENTS

| | | | |
|---|---|---|---|
| CN | 107110970 A | * | 8/2017 |
| DE | 10 2007 035219 A1 | | 1/2009 |

(Continued)

OTHER PUBLICATIONS

The Notification of Reason for Rejection issued in corresponding Japanese Patent Application No. 2017-506405, dated Feb. 23, 2018 (16 pages).

(Continued)

*Primary Examiner* — Daniel Pihulic
(74) *Attorney, Agent, or Firm* — Osha Liang LLP (57) ABSTRACT

The invention relates to a method for identifying at least one object (9, 10) in a surrounding area (7) of a motor vehicle (1), in which the motor vehicle (1) is moved relative to at least one object (9, 10) and, while the motor vehicle (1) is moved relative to the at least one object (9, 10), a measurement cycle is performed at each of a plurality of successive times, wherein each measurement cycle involves an ultrasonic sensor (4) of the motor vehicle (1) being used to transmit an ultrasonic signal, and a feature (14) being determined that describes a position value, which describes (Continued)

a position of the at least one object (9, 10) and which is ascertained on the basis of a first received echo of the ultrasonic signal, and a presence of a second echo of the ultrasonic signal that is received within a predetermined period of time after the first echo, wherein the respective features (14) are associated with a cluster (13) on the basis of their position value, and the features (14) of the cluster (13) are signalled as belonging to the at least one object (9, 10) on the basis of the presence of the second echo.

15 Claims, 5 Drawing Sheets

(51) Int. Cl.
*G01S 7/527* (2006.01)
*G01S 7/539* (2006.01)
*G01S 15/87* (2006.01)
*G01S 15/10* (2006.01)

(52) U.S. Cl.
CPC ............... *G01S 15/87* (2013.01); *G01S 15/10* (2013.01); *G01S 2015/935* (2013.01)

(56) References Cited

U.S. PATENT DOCUMENTS

| | | | | |
|---|---|---|---|---|
| 2015/0348414 A1* | 12/2015 | Jung | ................. | G08G 1/14 340/932.2 |
| 2017/0227641 A1* | 8/2017 | Bariant | ................. | G01S 15/931 |

FOREIGN PATENT DOCUMENTS

| | | | | | |
|---|---|---|---|---|---|
| DE | 102014111124 A1 | * | 2/2016 | ........... | G01S 15/931 |
| DE | 102014111125 A1 | * | 2/2016 | ........... | G01S 15/931 |
| EP | 1 308 751 A2 | | 5/2003 | | |
| EP | 1 643 271 B1 | | 10/2007 | | |
| EP | 1 910 866 B1 | | 9/2011 | | |
| EP | 3177942 A1 | * | 6/2017 | ........... | G01S 15/931 |
| JP | 2014 058247 A | | 4/2014 | | |
| KR | 20170038067 A | * | 4/2017 | ........... | G01S 15/931 |
| WO | WO-2016020343 A1 | * | 2/2016 | ........... | G01S 15/931 |
| WO | WO-2016020347 A1 | * | 2/2016 | ........... | G01S 15/931 |

OTHER PUBLICATIONS

International Search Report issued in PCT/EP2015/067871, dated Nov. 25, 2015 (2 pages).
Written Opinion of the International Searching Authority issued in PCT/EP2015/067871, dated Nov. 25, 2015 (8 pages).

* cited by examiner

METHOD FOR IDENTIFYING AT LEAST ONE OBJECT IN A SURROUNDING AREA OF A MOTOR VEHICLE BY MEANS OF AN ULTRASONIC SENSOR, DRIVER ASSISTANCE SYSTEM AND MOTOR VEHICLE

The present invention relates to a method for identifying at least one object in a surrounding area of a motor vehicle, in which the motor vehicle is moved relative to at least one object and, while the motor vehicle is moved relative to the at least one object, a measurement cycle is performed at each of a plurality of successive times, wherein each measurement cycle involves an ultrasonic sensor of the motor vehicle being used to transmit an ultrasonic signal, and a feature being determined that describes a position value, which describes a position of the at least one object and which is ascertained on the basis of a first received echo of the ultrasonic signal, and a presence of a second echo of the ultrasonic signal that is received within a predetermined period of time after the first echo. The invention relates moreover to a driver assistance system and to a motor vehicle.

In the present case, interest is directed particularly to driver assistance systems that assist the driver in manoeuvring the motor vehicle and particularly in parking the motor vehicle in a parking space. The prior art already discloses driver assistance systems that can use ultrasonic sensors to identify parking spaces or free parking slots and assist the driver in the parking manoeuvre. This usually involves the motor vehicle being moved past objects, which may be formed by parked vehicles. While it is being moved past, a measurement cycle is performed at each of predetermined times. Each measurement cycle involves an ultrasonic sensor being used to transmit an ultrasonic signal. This ultrasonic signal is reflected by the object and can be received again by the ultrasonic sensor. In this context, it is usually the case that multiple echoes are received from the transmitted ultrasonic signal.

In this regard, EP 1 643 271 B1 describes a method for classifying lateral restrictions for a parking space for a parking system of a motor vehicle. In this context, a distance sensor of the motor vehicle is used to transmit a signal and to evaluate and classify an echo signal. The evaluation and classification of the echo signal is effected in this case in regard to the pulse length and the amplitude of the echo signal. This allows a height of the lateral restriction to be ascertained, for example, since a high lateral restriction, such as a wall, usually has a greater pulse width and a higher amplitude than a low lateral restriction, for example a kerb.

Furthermore, EP 1 910 866 B1 discloses a method for ascertaining a depth restriction for a parking space by means of an ultrasonic sensor. In this context, a comparison of the range of scatter of all echo signals from the ultrasonic sensor and/or of multiple echo signals forming a signal concentration, in particular, is used to make a statement about whether an object restricts the depth of a parking space. If the parking space is bounded by a wall, for example, then it may be the case that all of the echo signals are reflected from the wall, which is why the range of scatter of all of the signals is then very small.

It is an object of the present invention to demonstrate a solution as to how at least one object in the surrounding area of the motor vehicle can be identified more reliably by means of an ultrasonic sensor.

This object is achieved according to the invention by a method, by a driver assistance system and by a motor vehicle having the features according to the respective independent patent claims. Advantageous embodiments of the invention are the subject matter of the dependent patent claims, the description and the figures.

A method according to the invention is used for identifying at least one object in a surrounding area of a motor vehicle. In this context, the motor vehicle is moved relative to at least one object and, while the motor vehicle is moving relative to the at least one object, a measurement cycle is performed at each of a plurality of temporally successive times. Each measurement cycle involves an ultrasonic sensor of the motor vehicle being used to transmit an ultrasonic signal. In addition, a feature is determined for each measurement cycle. In this case, the feature comprises a position value that describes a position of the at least one object. This position value is ascertained on the basis of a first received echo of the ultrasonic signal. Furthermore, the feature describes a presence of a second echo of an ultrasonic signal that is received within a predetermined period of time after the first echo. The respective features are associated with a cluster on the basis of their position value, and the features of the cluster are signalled as belonging to the at least one object on the basis of the presence of the second echo.

The present invention is based on the insight that the at least one object in the surrounding area of the motor vehicle can be identified more reliably if the features that are ascertained in the respective measurement cycles are clustered. In this case, clustering of the features at the individual measurement cycles is effected on the basis of the respective position values. The position values can be used to plausibilise the respective features to determine whether they represent a reliable measurement result that describes the distance from the motor vehicle to the at least one object.

The features that are associated with the cluster each comprise the information concerning whether a second echo has been received in the respective measurement cycle of the feature. This particularly takes into consideration whether the second echo has been received within a predetermined period of time after the first echo. The presence of the second echo in the respective features can be taken as a basis for associating the features or a predetermined number of the features with the at least one object. In this way, it is reliably possible to determine those measurement cycles in which the object has been identified. This allows the at least one object to be identified more reliably in the surrounding area of the motor vehicle.

Preferably, an area is determined that comprises a predetermined number of features of the cluster, and the predetermined area is signalled as belonging to the object if a sum of the number of second echoes present for the features in the predetermined area exceeds a predetermined threshold value. In other words, a window is determined that is placed over the features in the cluster. Hence, a predetermined number of features that are in the area or in the window is examined. Subsequently, it is possible to ascertain how many of the features in the area have a second echo. If the number of second echoes of the features in the predetermined area exceeds a threshold value, which is 50%, for example, then the predetermined area is signalled as belonging to the object. Furthermore, the object can be classified as an object that has a predetermined height. Hence, it is a simple matter to determine which features in the cluster belong to the at least one object.

Moreover, it is advantageous if the area is determined such that the predetermined number of features are associated with temporally successive measurement cycles. In the predetermined area, features examined for the presence of the second echo are thus those that have been ascertained for temporally successive measurement cycles and that have been associated with the cluster on the basis of their position values. Hence, the features that were ascertained at predetermined times when the motor vehicle was moved relative to the at least one object can be checked for the presence of the second echo in respective groups that are associated with the predetermined area. It is therefore possible to examine whether or not the areas can be associated with the at least one object.

In a further embodiment, the predetermined area is shifted along the features in the cluster and a check is performed for each position of the predetermined area to determine whether the features of the predetermined area belong to the at least one object. In other words, the window or the area is moved over the cluster. In this case, the area can be shifted such that it is shifted in each case by one feature along a predetermined direction along the features in the cluster. After the respective shifting of the area, a check is performed to determine whether the area can be associated with the at least one object. Hence, it is a simple matter to check which features in the cluster describe the at least one object and which do not.

Preferably, the features are entered into a map on the basis of their respective position value, and the features are associated with the cluster on the basis of their position in the map. The map may be plotted over two mutually orthogonal spatial directions, for example. These spatial directions can correspond to a world coordinate system that describes the relative position of the motor vehicle in relation to the at least one object. In this case, the features that are spatially arranged in a predetermined area can be associated with the cluster. The map can be used to interpret the features geometrically in a simple manner, and hence a decision can be made as to whether or not the respective features belong to at least one object.

Preferably, the features entered into the map that are arranged along a predetermined line are associated with the cluster. This aspect is based on the insight that the objects in the surrounding area of the motor vehicle that restrict a parking space, for example, usually have a rectangular shape. Such objects may be parked motor vehicles, kerbs or a wall, for example. If, in the present case, only features that are arranged along a line in a map are considered, then it can be assumed that they belong to a rectangular object. This means that the at least one object in the surrounding area of the motor vehicle can be reliably identified.

In a further embodiment, a first group of the features of the cluster is signalled as belonging to a first object on the basis of the presence of the second echo, and a second group of the features of the cluster, which is different from the first group, is signalled as belonging to a second object on the basis of the presence of the second echo. In other words, the features in the cluster can be split and associated with different objects. By way of example, features for which a second echo is present can be associated with a first group. Features for which there is no second echo, or no second echo that follows the first echo at a predetermined interval of time, present can be associated with a second group. As such, the first group can be associated with a first object such as a parked motor vehicle and the second group can be associated with a kerb, for example. In this way, it is also possible for multiple objects in the surrounding area of the motor vehicle to be reliably identified.

Preferably, predetermined minimum dimensions are prescribed for the first and/or the second object. If the features of the cluster are categorised in different groups and hence are associated with different objects, then a minimum length can be prescribed for the respective objects, for example. When the features are categorised into the groups, it is thus possible to take into consideration a length of the objects that are associated with the respective groups. In this context, it is possible for the features not to be associated with a group if this group were to belong to an object that does not reach the minimum length. In this case, the cluster cannot be divided. This is found to be advantageous, in particular, when parking spaces or free parking slots that have a predetermined minimum length are meant to be identified in the surrounding area of the motor vehicle.

Preferably, a position of the motor vehicle is ascertained continually while the motor vehicle is moved relative to the at least one object, and the position value of the respective measurement cycle is determined such that it additionally describes the ascertained position of the motor vehicle when a measurement cycle is performed. The position of the motor vehicle when the motor vehicle is moved at the at least one object can be determined using a satellite-based locating system, for example. Alternatively, the position of the motor vehicle when it is moved at the at least one object can be ascertained by means of odometry. The respective position value that is associated with the respective feature can additionally be used to store a piece of information that describes the current position of the motor vehicle. Hence, the respective position value can describe a relative position of the motor vehicle in relation to the at least one object. In this case, there may also be provision for the position of the motor vehicle when it is moved to be ascertained and for the measurement cycles to be performed at predetermined position values. This position information for the motor vehicle can also be taken into consideration in the map, into which the individual features are entered and grouped to form the cluster.

Additionally, it is advantageous if a ratio between the number of echoes and the number of second echoes for the features of the measurement cycles is determined. It is thus possible to put the total number of echoes from a predetermined number of measurement cycles into a ratio with a number of second echoes from the predetermined number of measurement cycles. This aspect is based on the insight that the speed of the motor vehicle while it is moved past the at least one object can change. By way of example, the speed of the motor vehicle can decrease when a free parking space is identified. If the speed decreases, then it may be the case that multiple echoes of the ultrasonic signal are received. If the speed of the motor vehicle is reduced, the total number of echoes increases but the ratio remains the same. The speed of the motor vehicle has no effect on the measurement result owing to the determination of the ratio between the number of echoes and the number of second echoes when the respective measurement cycle is performed. Hence, it is possible to achieve the effect that the current speed of the motor vehicle does not or only slightly influence(s) the association of the features with the object. In this way, the at least one object can be reliably identified. Additionally, there may also be provision for the speed of the motor vehicle to be ascertained continually while the motor vehicle is moved relative to the at least one object and for the features to be associated with the at least one object on the basis of the ascertained speed.

In a further configuration, the respective second echo for the features is used to determine a height of the at least one object. If the second object is present or arises within a predetermined period of time after the first echo, then it can be assumed that the at least one object in the surrounding area of the motor vehicle has a predetermined height. If the second object is present or follows the first echo within a short period of time, then the at least one object may be a parked vehicle, for example. In the other case, there may be no object present in the surrounding area, for example, or there is a relatively low object in the surrounding area of the motor vehicle. In this way, the at least one object in the surrounding area of the motor vehicle can be classified.

Additionally, it is advantageous if the belonging of the features of the cluster to the at least one object is used to ascertain a travel trajectory for moving the motor vehicle relative to the at least one object. The features of the cluster that are associated with the at least one object can be used to ascertain the relative position of the at least one object in relation to the motor vehicle. The relative position of the motor vehicle in relation to the object can be used to determine a travel trajectory that can be used to move the motor vehicle past the object. In this regard, it is also possible for the external dimensions of the motor vehicle to be taken into consideration.

In a further embodiment, the motor vehicle is manoeuvred along the ascertained travel trajectory at least semiautonomously. By way of example, a driver assistance system of the motor vehicle can undertake steering of the motor vehicle along the travel trajectory. In this case, the driver accelerates and operates the brake. Alternatively, the motor vehicle can be moved along the travel trajectory autonomously. In this case, the driver assistance system takes action on the drive device and the brake device of the motor vehicle. Hence, the driver can be assisted in a parking manoeuvre, for example, particularly reliably.

A driver assistance system according to the invention is designed to perform a method according to the invention. The driver assistance system can comprise a control device, for example, that is designed for performing the method according to the invention.

A motor vehicle according to the invention comprises a driver assistance system according to the invention. The motor vehicle is particularly in the form of a car.

The embodiments presented in regard to the method according to the invention, and the advantages thereof, apply accordingly to the driver assistance system according to the invention and to the motor vehicle according to the invention.

Further features of the invention will emerge from the claims, the figures and the description of the figures. All features and combinations of features cited in the description above and the features and combinations of features cited in the description of the figures below and/or shown in the figures alone can be used not only in the respective indicated combination but also in other combinations or else on their own.

The invention is now explained in more detail using a preferred exemplary embodiment and with reference to the appended drawings, in which.

Figure 1:
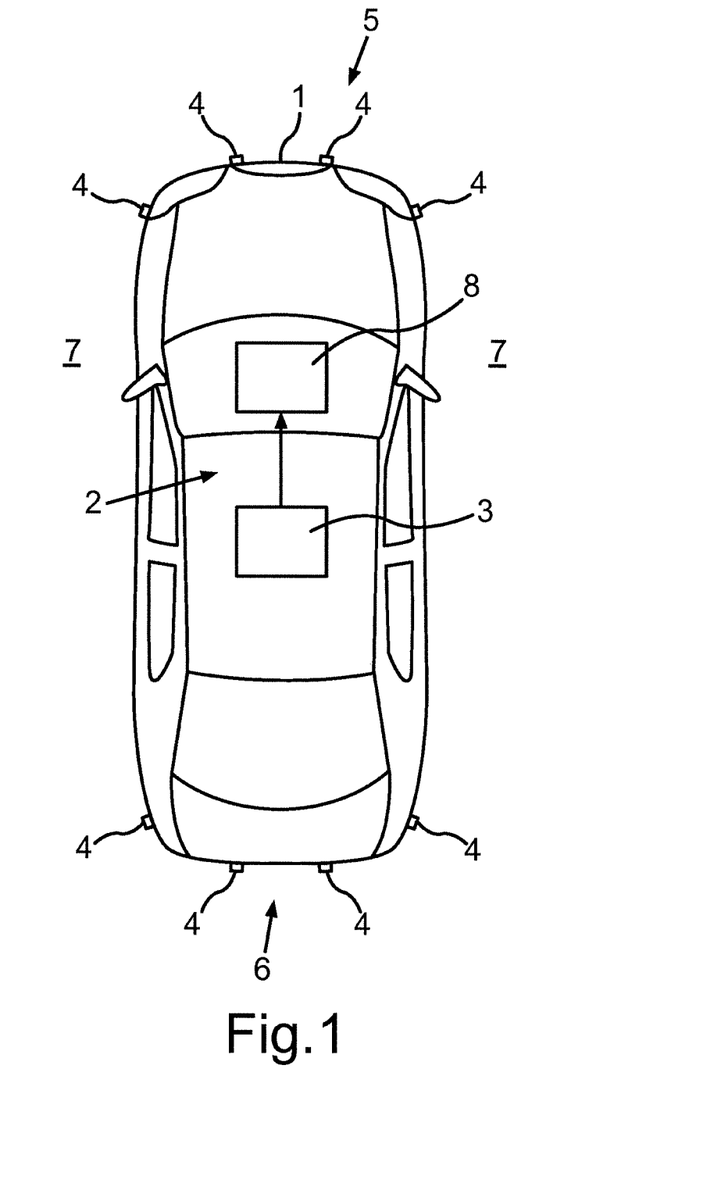
FIG. 1 shows a schematic depiction of a motor vehicle according to an embodiment of the present invention.

FIG. 1 shows a motor vehicle 1 according to an embodiment of the present invention. In the present exemplary embodiment, the motor vehicle 1 is in the form of a car. The motor vehicle 1 comprises a driver assistance system 2. The driver assistance system 2 in turn comprises a control device 3, which may be formed by a controller (Electronic Control Unit—ECU) of the motor vehicle 1, for example. Furthermore, the driver assistance system 2 comprises a sensor device 9.

In the present exemplary embodiment, the sensor device 9 comprises eight ultrasonic sensors 4. In this case, four ultrasonic sensors 4 are arranged in a front area 5 of the motor vehicle 1 and four ultrasonic sensors 4 are arranged in a rear area 6 of the motor vehicle 1. The ultrasonic sensors 4 are designed to identify an object 9, 10 in a surrounding area 7 of the motor vehicle 1 and to determine a distance from the object 9, 10. The respective ultrasonic sensors 4 can transmit an ultrasonic signal. This ultrasonic signal can be reflected by an object in the surrounding area 7 of the motor vehicle 1. This reflected signal or echo of the ultrasonic signal can be sensed again by the ultrasonic sensor 4. The propagation time of the ultrasonic signal, that is to say the timing difference between transmission of the ultrasonic signal and reception of the echo, can be used to determine the distance between the motor vehicle 1 and the object 9, 10.

Furthermore, the motor vehicle 1 comprises a drive device 8. The drive device 8 can be used for actuating a drive train of the motor vehicle 1. By way of example, the drive device 8 can be used to actuate a drive motor and/or a brake system of the motor vehicle 1. In addition, there may be provision for the drive device 8 to be able to be used to actuate a steering of the motor vehicle 1. The control device 3 is connected to the ultrasonic sensors 4 for the purpose of data transmission. Corresponding data lines are not depicted in the present case for the sake of clarity. Furthermore, the control device 3 is connected to the drive device 8 for the purpose of data transmission.

The driver assistance system 2 can additionally ascertain the current position of the motor vehicle 1. To this end, it is possible to take into consideration the signals from a satellite-based position finding system. Furthermore, the current position of the motor vehicle 1 can be determined by means of odometry. For this purpose, it is possible to ascertain the number of wheel revolutions of at least one wheel of the motor vehicle 1 and/or a steering angle of the motor vehicle 1, for example. The current position of the motor vehicle 1 and the distance between the motor vehicle 1 and the object 9, 10, which is determined using at least one ultrasonic sensor 4, can be used to ascertain the relative position of the motor vehicle 1 in relation to the object 9, 10.

Furthermore, the control device 3 is designed to compute a travel trajectory 12 for the motor vehicle 1 that describes a collision-free movement of the motor vehicle 1 past the object 9, 10 in the surrounding area 7 of the motor vehicle 1. In this regard, it is also possible to take into consideration the external dimensions of the motor vehicle 1, which are stored in a memory device of the control device 3, for example. The driver assistance system 2 can be used to move the motor vehicle 1 along the travel trajectory semiautonomously. In this case, steering is undertaken by the driver assistance system 2. The driver continues to operate the accelerator pedal and the brake. Alternatively, the motor vehicle 1 can also be moved along the travel trajectory 12 autonomously. In this case, the driver assistance system 2 also controls driving and braking of the motor vehicle 1.

Figure 2:
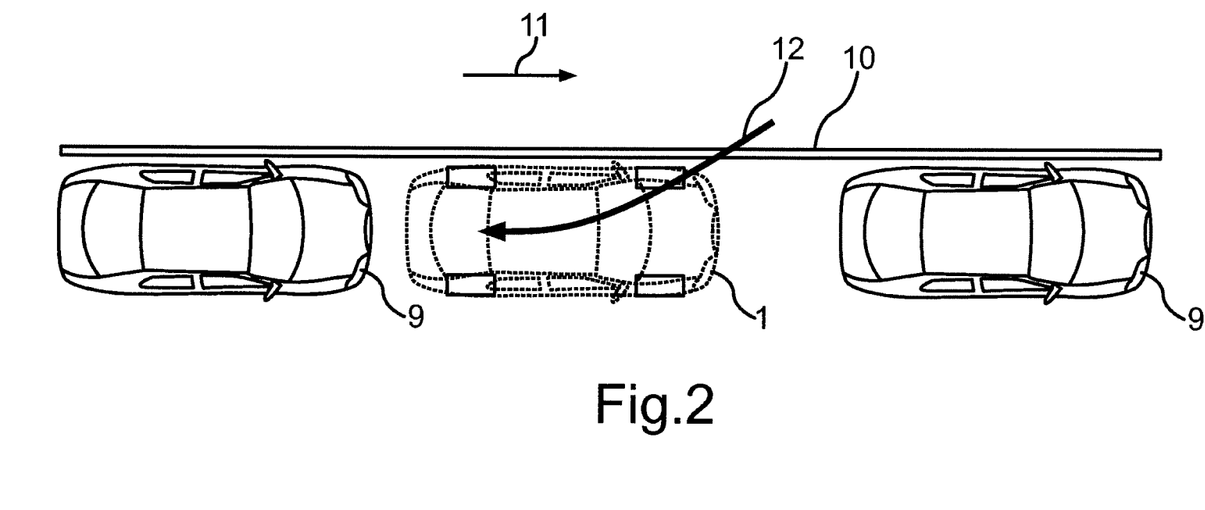
FIG. 2 shows the motor vehicle when parking in a parking space that is restricted by objects in the surrounding area of the motor vehicle.

FIG. 2 shows the motor vehicle 1 when parking in a parking space. To identify the parking space, the motor vehicle 1 is moved past the parking space. The direction of travel of the motor vehicle 1 is illustrated by the arrow 11.

In the present case, the parking space is restricted by two objects 9. In the present case, the objects 9 are formed by parked vehicles. In addition, there is an object 10, which is formed by a kerb in the present case, in front the parking space. The motor vehicle 1 thus has to cross the kerb in order to get into the parking space along the travel trajectory 12. The challenge is that, in the present case, the driver assistance system 2 needs to decide whether a high object 9, for example a parked vehicle, or a low object 10, for example the kerb, is involved.

If the motor vehicle 1 is moved past the objects 9, 10 along the arrow 11, then a measurement cycle is performed at each of the predetermined times. In each measurement cycle, the ultrasonic sensors 4 transmit an ultrasonic signal. Furthermore, the echoes of the ultrasonic signal are received using the ultrasonic sensors 4. For each measurement cycle, a feature 14 is determined. The feature 14 comprises a position value that is ascertained on the basis of the first echo of the ultrasonic signal. The position value thus describes a relative position between the motor vehicle 1 and the respective object 9, 10. In this case, it is also possible—as described above—for the current position of the motor vehicle 1 to be sensed while it travels past the objects 9, 10, and to be taken into consideration in the position value. Furthermore, the feature 14 describes, for each measurement cycle, whether a second echo is present or follows the first echo of the ultrasonic signal at a predetermined interval of time. If the second echo does follow the first echo within a predetermined interval of time, then it can be assumed that the object 9, 10 is a high object, for example a parked vehicle.

The individual features 14 are entered into a map on the basis of their position value. In this context, there also may also be provision for features 14 from multiple measurement cycles to be combined. This is the case, for example, when the distance from the motor vehicle 1 to the object 9, 10 is determined by means of triangulation. Subsequently, a check is performed to determine whether the features 14 in the map can be grouped to form a cluster. For this purpose, it is possible to check whether the features 14 are arranged along a predetermined geometric element on the basis of their geometric arrangement in the map. In particular, it is possible to examine whether the features 14 are arranged along a line in the map. This is based on the insight that the objects 9, 10 in the surrounding area 7 of the motor vehicle 1 usually have a substantially rectangular shape. Hence, the outer face of the object 9, 10, which outer face adjoins the motor vehicle 1 and is sensed using the ultrasonic sensors 4, usually describes a line or straight line. A regression line can be used to determine the position of an edge of the object 9, 10.

The features 14 can contain further information. By way of example, an orientation of the motor vehicle 1 or of the ultrasonic sensor 4 when the object 9, 10 is sensed may be stored. Additionally, it is possible to take into consideration the probability with which the object 9, 10 has been sensed. In addition, the height of the object 9, 10 can be ascertained on the basis of the second echo. Furthermore, a value that describes a spatial uncertainty can be determined.

Figure 3:
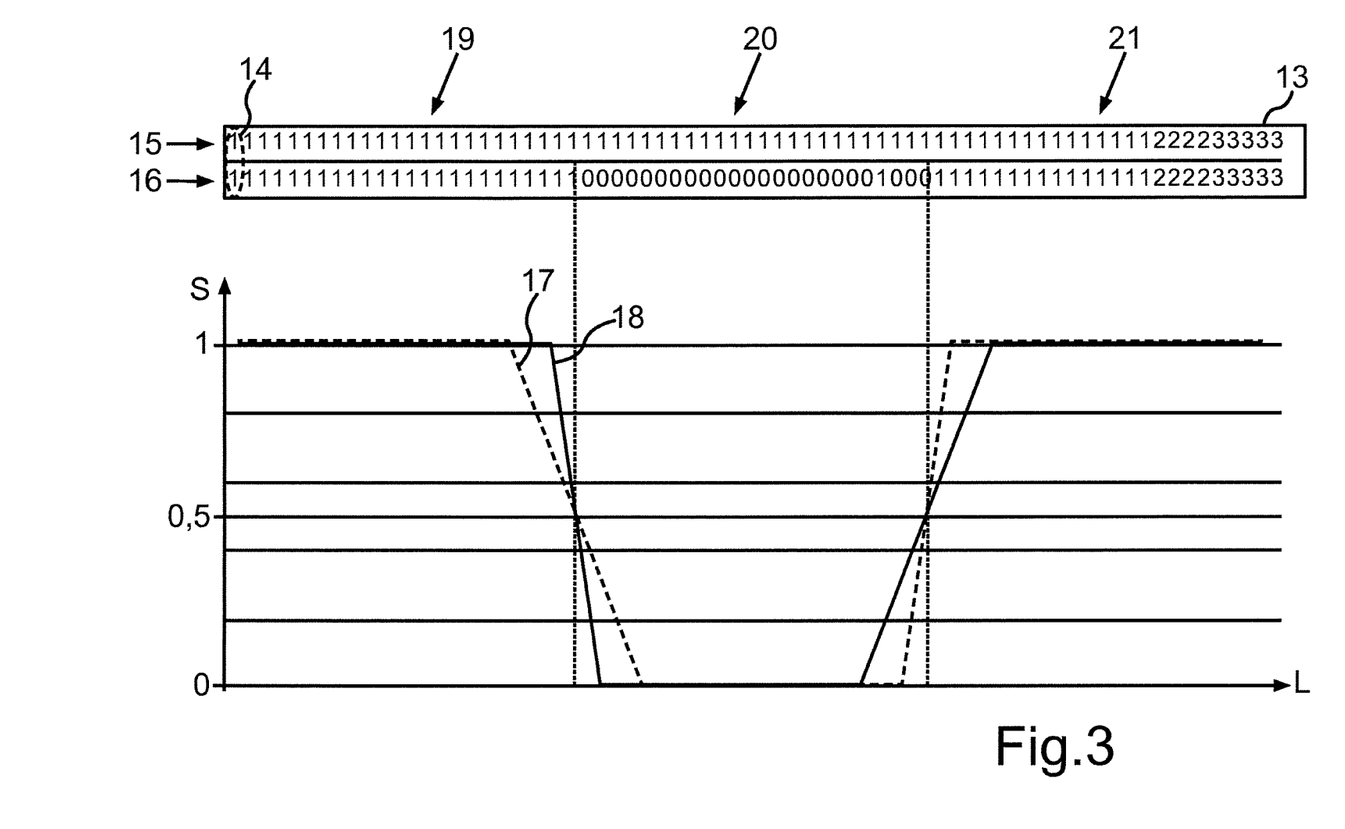
FIGS. 3 to 5 show different embodiments in which features that have been ascertained using an ultrasonic sensor of the motor vehicle are used to identify objects in the surrounding area of the motor vehicle.

The features 14 that can be associated with a straight line continue to be examined. In particular, it is examined whether the features 14 can be associated with one of the objects 9, 10. This is illustrated in FIG. 3. The individual features 14 associated with the cluster 13 are shown in the upper area of FIG. 3. The number of echoes received for each of the features 14 or measurement cycles is described in the first row 15 in this case. The number of second echoes is described in the second row 16. It can be seen in this case that the number of echoes received and the number of second echoes increase at the end of rows 15 and 16. The reason is that the motor vehicle 1 has decreased its speed.

The lower area of the FIG. 3 shows a graph in which the position L is plotted on the abscissa. By way of example, in the present case, a measure cycle can be performed, that is to say a feature 14 can be sensed, every 40 cm. The threshold value S is plotted on the ordinate. In the present case, an area or a window that comprises the predetermined number of features 14 of the cluster 13 is predetermined. Within the area or the window, a check is performed to determine whether the proportion of second echoes in the area exceeds the predetermined threshold value S. In the example shown here, the threshold value S is 50%.

In the present case, the area or the window is moved over the individual features 14 of the cluster 13. The line 17 describes the result for the case in which the area has a length of 2 m. In comparison therewith, the line 18 shows the result for an area that has a width of 60 cm. If the lines 17, 18 assume the value 1, then it can be assumed that there is a high object 9 in the surrounding area 7 of the motor vehicle 1. If the lines 17, 18 assume the value 0, on the other hand, then it can be assumed that there is no object or a low object 10 in the surrounding area 7 of the motor vehicle 1. In the present example, which corresponds to the situation according to FIG. 2, the areas 19 and 21 can be associated with a high object, while the area 20 is associated with a low object. The cluster 13 can therefore be divided into three areas 19, 20, 21, each of the areas 19, 20, 21 being associated with an object 9, 10.

Figure 4:
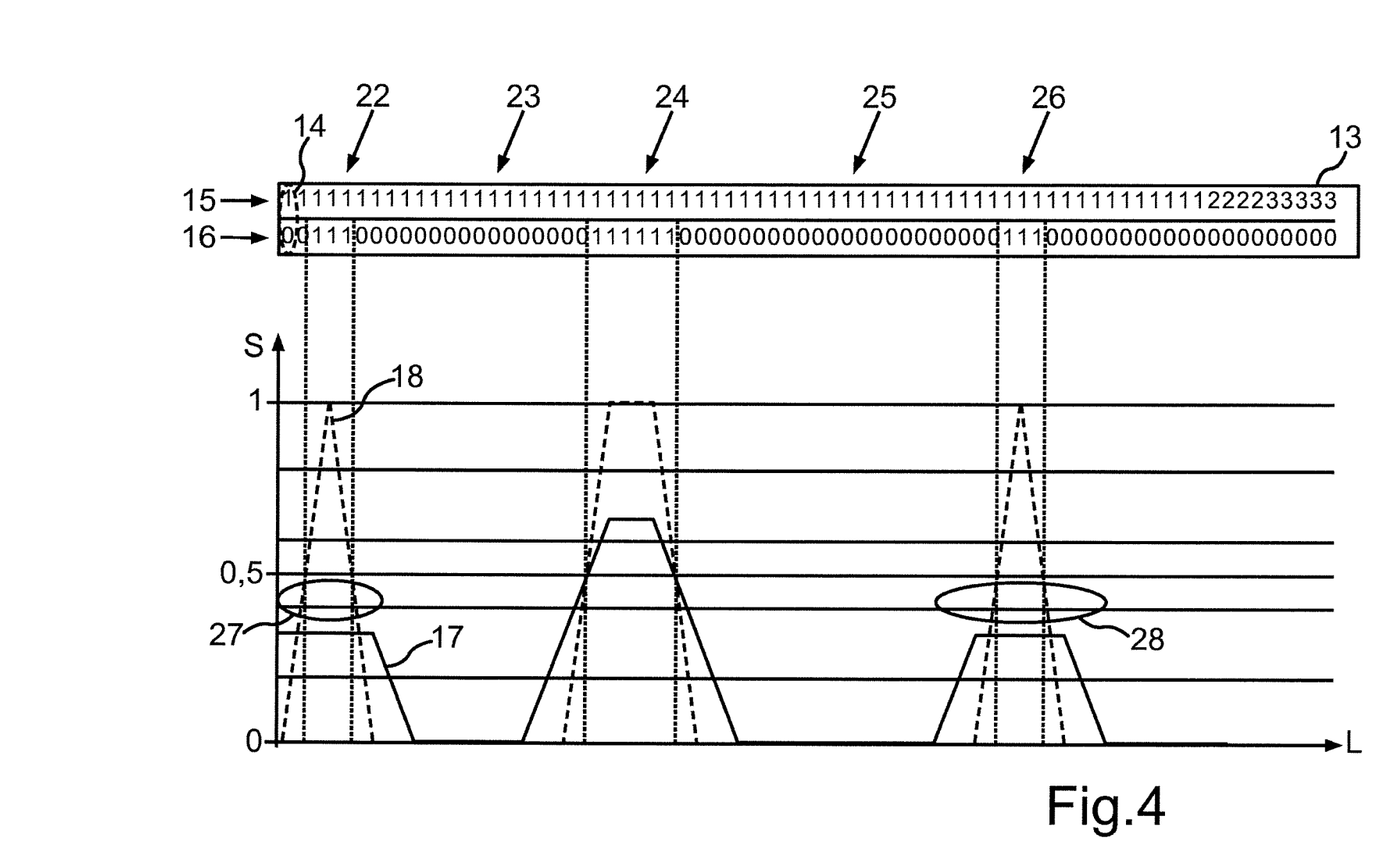

The width of the areas that are moved over the cluster 13 can determine the spatial resolution for sensing the objects 9, 10. This is shown by way of example in FIG. 4. In this case, single narrow objects, for example, which may be formed by a dust bin, for example, cannot be sensed by a window width of 2 m. An area or a window that has a width of 60 cm also allows narrow objects in the surrounding area 7 of the motor vehicle 1 to be sensed. In the present case, the cluster 13 can be split into the areas 22, 23, 24, 25, 26 etc. In this case, the areas 22, 24 and 26 can be associated with high objects 9, 10.

Figure 5:
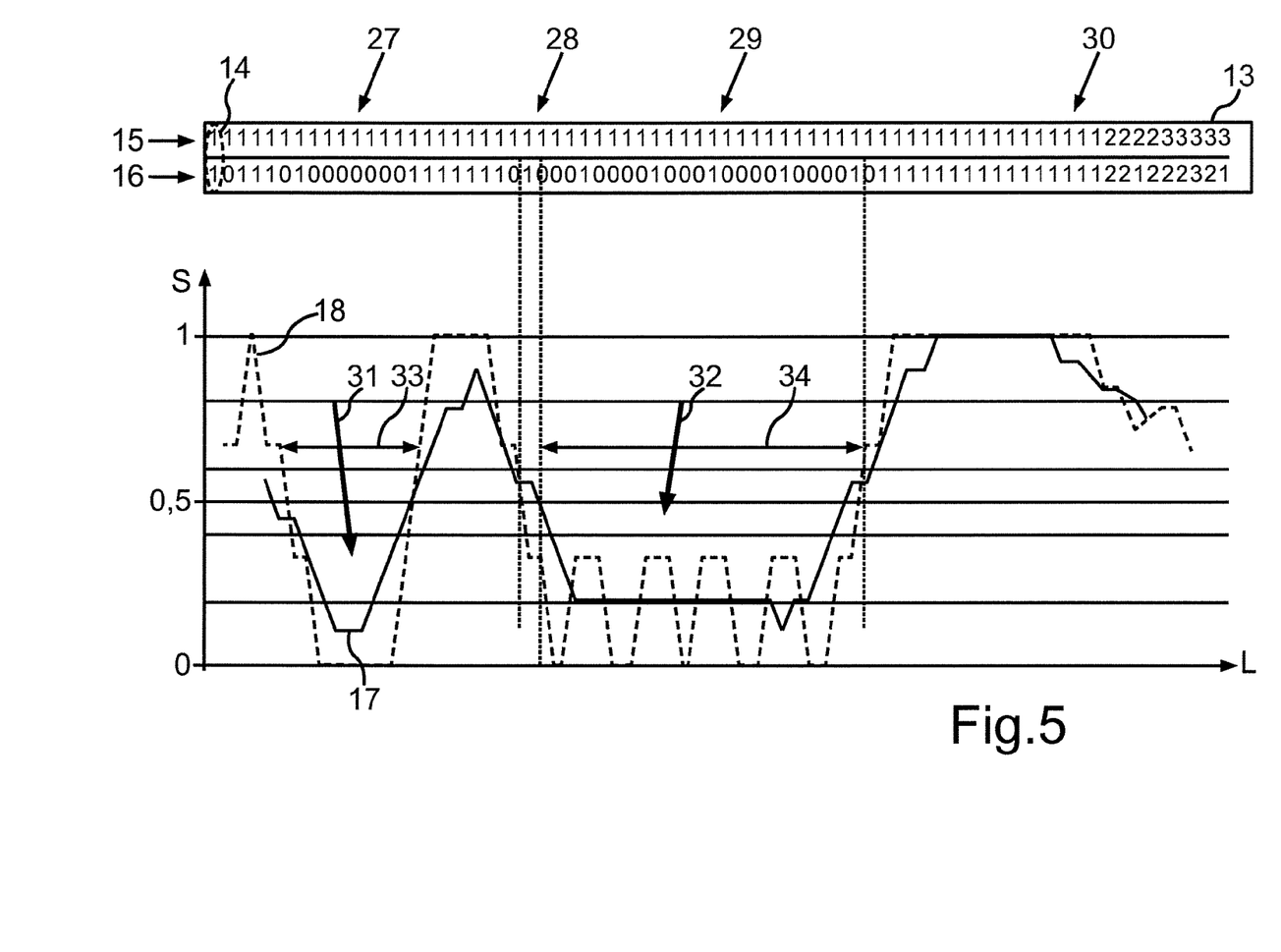

When sensing the objects 9, 10 in the surrounding area 7 of the motor vehicle 1, it may be the case that a second echo cannot be reliably sensed by an ultrasonic sensor 4. This is illustrated in FIG. 5 by the area denoted by the arrow 31. In addition, it may be the case that second echoes can also be received by the ultrasonic sensors 4 for a low object, for example a kerb. This can be seen in the area denoted by the arrow 32. In this case, the profile of the line 18 in the area denoted by the arrow 32 incorrectly indicates multiple areas that could be associated with objects 9, 10. In this case, a kerb, for example, would be categorised into multiple objects 9, 10. To prevent this, a predetermined minimum dimension can be prescribed for the objects 9, 10. This minimum dimension or the minimum length can be used to decide whether or not the cluster 13 is categorised into individual areas. If second echoes are not received, it is possible to decide that the whole area 27 is associated with an object, since the area (denoted by the arrow 33 in the present case) does not exceed the minimum dimension.

If second echoes are received incorrectly, it is possible to decide that the area denoted by the arrow 34 in the present case can be associated with a single object 9, 10. In the present case, both the areas 28 and the area 29 of the cluster 13 are associated with an object 9, 10. Finally, an area 30 of the cluster 13 is associated with an object 9, 10. The method can identify objects 9, 10 in the surrounding area of the motor vehicle 1 more reliably. In addition, the accuracy for classifying the objects 9, 10 can be increased.

The invention claimed is:

1. The method for identifying at least one object in a surrounding area of a motor vehicle, comprising:
    moving the motor vehicle relative to at least one object; and,
    while the motor vehicle is moved relative to the at least one object, performing a measurement cycle at each of a plurality of successive times,
    wherein each measurement cycle involves an ultrasonic sensor of a motor vehicle being used to transmit an ultrasonic signal, and a feature being determined that describes a position value of a position of the at least one object,
    the position value being ascertained on the basis of a first received echo of the ultrasonic signal, and a presence of a second echo of the ultrasonic signal that is received within a predetermined period of time after the first echo,
    wherein the respective features are associated with a cluster on the basis of corresponding position values, and the features of the cluster are signalled as belonging to the at least one object on the basis of the presence of the second echo.

2. The method according to claim 1, wherein an area is predetermined that comprises a predetermined number of features of the cluster, and the predetermined area is signalled as belonging to the object if a sum of the number of second echoes present for the features in the predetermined area exceeds a predetermined threshold value.

3. The method according to claim 2, wherein the area is predetermined such that the predetermined number of features are associated with temporally successive measurement cycles.

4. The method according to claim 2, wherein the predetermined area is shifted along the features in the cluster and a check is performed for each position of the predetermined area to determine whether the features of the predetermined area belong to the at least one object.

5. The method according to claim 1, wherein the features are entered into a map on the basis of their respective position value, and the features are associated with the cluster on the basis of their position in the map.

6. The method according to claim 5, wherein the features entered into the map that are arranged along a predetermined line are associated with the cluster.

7. The method according to claim 1, wherein a first group of the features of the cluster is signalled as belonging to a first object on the basis of the presence of the second echo, and a second group of the features of the cluster, which is different from the first group, is signalled as belonging to a second object on the basis of the presence of the second echo.

8. The method according to claim 7, wherein predetermined minimum dimensions are prescribed for the first and/or the second object.

9. The method according to claim 1, wherein a position of the motor vehicle is ascertained continually while the motor vehicle is moved relative to the at least one object, and the position value of the respective measurement cycle is determined such that the ascertained position of the motor vehicle is described when a measurement cycle is performed.

10. The method according to claim 1, wherein a ratio between the number of echoes and the number of second echoes for the features of the measurement cycles is determined.

11. The method according to claim 1, wherein the respective second echo for the features is used to determine a height of the at least one object.

12. The method according to claim 1, wherein the belonging of the features of the cluster to the at least one object is used to ascertain a travel trajectory for moving the motor vehicle relative to the at least one object.

13. The method according to claim 12, wherein the motor vehicle is manoeuvred along the ascertained travel trajectory at least semiautonomously.

14. A driver assistance system having a control device that is configured to execute a method according to claim 1.

15. A motor vehicle having a driver assistance system according to claim 14.

* * * * *